United States Patent [19]
Wildhagen

[11] Patent Number: 6,075,410
[45] Date of Patent: Jun. 13, 2000

[54] METHOD AND DEVICE FOR DIGITALLY DEMODULATING A FREQUENCY MODULATED SIGNAL

[75] Inventor: Jens Wildhagen, Weinstadt, Germany

[73] Assignee: Sony International (Europe) GmbH, Berlin, Germany

[21] Appl. No.: 09/259,230

[22] Filed: Mar. 1, 1999

[30] Foreign Application Priority Data

Mar. 3, 1998 [EP] European Pat. Off. .............. 98103735

[51] Int. Cl.[7] .............................. H03D 3/00; H04L 27/14
[52] U.S. Cl. ......................... 329/318; 329/341; 375/324
[58] Field of Search .................................. 329/341, 318; 375/324

[56] References Cited

U.S. PATENT DOCUMENTS

| | | | |
|---|---|---|---|
| 4,887,050 | 12/1989 | Borth et al. | 331/34 |
| 5,970,086 | 10/1999 | Epstein et al. | 375/219 |

FOREIGN PATENT DOCUMENTS

| | | |
|---|---|---|
| 0 274 050 A2 | 7/1988 | European Pat. Off. . |
| 0 349 064 A1 | 1/1990 | European Pat. Off. . |
| 0 546 614 A1 | 6/1993 | European Pat. Off. . |
| 0 648 037 A1 | 4/1995 | European Pat. Off. . |
| 2 234 411 | 1/1991 | United Kingdom . |

OTHER PUBLICATIONS

Tribolet: "A new phase unwrapping algorithm" IEEE Transactions on Acoustics, Speech and Signal Processing, vol. 25, No. 2, Apr. 1977, pp. 170–177, XP000573498.

*Primary Examiner*—Siegfried H. Grimm
*Attorney, Agent, or Firm*—Frommer Lawrence & Haug, LLP.; William S. Frommer

[57] ABSTRACT

A method and device for digitally demodulating a frequency modulated signal includes: calculating a phase of a digital complex baseband signal of a received frequency modulated signal, calculating an unwrapped phase of the calculated phase, detecting and eliminating $2\pi$ phase jumps in the unwrapped phase to generate a corrected phase, and differentiating the corrected phase.

30 Claims, 12 Drawing Sheets

METHOD AND DEVICE FOR DIGITALLY DEMODULATING A FREQUENCY MODULATED SIGNAL

DESCRIPTION

The present invention is concerned with a method and a device for digitally demodulating a frequency modulated signal, for example a stereo broadcast signal, in particular with the extension of the fm-threshold of a digital fm-receiver.

The modulating signal s(t) is frequency modulated:

$$a_{fm}(t) = \cos\left(\omega_c t + \Delta\omega \int_{-\infty}^{t} s(\tau)d\tau\right), \tag{0}$$

wherein $\omega_C$ denotes the carrier frequency and $\Delta\omega$ denotes the frequency deviation.

FIG. 10 shows a state of the art digital fm-demodulator, which makes use of the CORDIC-algorithm. The received fm-modulated signal $a_{fm}(t)$ is down-converted to the IF (intermediate frequency) by an analog frontend block 1 to an IF-signal b(t). This IF-signal b(t) gets sampled by an A/D-converter 2 with the sampling period T.

$$b(kT) = B \cdot \cos\left(\omega_{IF} kT + \Delta\omega \int_{-\infty}^{kT} s(\tau)d\tau\right), \tag{1}$$

and converted to a complex baseband signal $$c_T(kT) = B \cdot e^{j\Delta\omega \int_{-\infty}^{kT} s(\tau)d\tau}, \tag{2}$$

by an IQ-generation means 3. There are several algorithms existing for a digital fm-demodulation. The fm-demodulator shown in FIG. 10 makes use of the CORDIC-algorithm. The fm-demodulation is principally done by differentiating the angle $\phi_c(kT)$ of the complex baseband signal $c_T(kT)$:

$$\varphi_c(kT) = \Delta\omega \int_{-\infty}^{kT} s(\tau)d\tau, \tag{3}$$

$$\left.\frac{d}{dt}\varphi_c(t)\right|_{kT} = \Delta\omega s(kT).$$

With the approximation $$\left.\frac{d}{dt}\varphi_c(t)\right|_{kT} \approx \frac{\varphi_c(kT) - \varphi_c((k-1)T)}{T}$$

follows:

$$s(kT) \approx \frac{1}{\Delta\omega T}(\varphi_c(kT) - \varphi_c((k-1)T)), \tag{4}$$

wherefrom it can be seen that the fm-demodulation performed by the CORDIC block 4 and the differentiation block 7 is done by a determination of the angle of two samples of the complex baseband signal $c_T(kT)$ in the CORDIC block 4 and a subtraction in the differentiation block 7.

The CORDIC algorithm calculates the modulo $2\pi$ divided phase $\phi(kT)$ of the complex baseband signal $c_T(kT)$ by a transformation from cartesian coordinates to polar coordinates.

$$\varphi(kT) = \text{mod}_{2\pi}\{\varphi_c(kT)\} = \text{mod}_{2\pi}\left\{\Delta\omega \int_{-\infty}^{kT} s(\tau)d\tau\right\} \tag{5}$$

This CORDIC-algorithm is well-known. FIG. 11 and the following table 1 give a short introduction to this algorithm. FIG. 11 shows the complex plane with the pointers of 5 samples of the complex baseband signal $c_T(kT)$. The argument range of the CORDIC-algorithm is limited to $[-\pi, \ldots, \pi]$. Therefore, the phase $\phi(kT)$ calculated with the CORDIC-algorithm is modulo $2\pi$ divided. The following table 1 shows the absolute phase $\phi_c(kT)$ of the complex baseband signal $c_T(kT)$ and the modulo $2\pi$ divided phase $\phi(kT)$ calculated with the CORDIC-algorithm.

TABLE 1

| k | 1 | 2 | 3 | 4 | 5 |
|---|---|---|---|---|---|
| $\phi(kT)$ | $2\pi/5$ | $4\pi/5$ | $-4\pi/5$ | $-\pi/5$ | $\pi/5$ |
| $\phi_c(kT)$ | $2\pi/5$ | $4\pi/5$ | $6\pi/5$ | $9\pi/5$ | $11\pi/5$ |

State of the art demodulators using the CORDIC-algorithm demodulate the fm-modulated baseband signal $c_T(kT)$ by the subtraction explained in equation (4). Since the CORDIC-algorithm calculates the modulo $2\pi$ divided phase $\phi(kT)$ as explained above, the subtraction is carried out therewith and the following modulating signal s(kT) as obtained:

$$s(kT) \approx \frac{1}{\Delta\omega T}(\varphi(kT) - \varphi((k-1)T)). \tag{6}$$

The following table 2 shows the phase difference calculated within this operation for the modulo $2\pi$ divided phase $\phi(kT)$ and for the absolute phase $\phi_c(kT)$:

TABLE 2

| k | 2 | 3 | 4 | 5 |
|---|---|---|---|---|
| $\phi(kT) - \phi((k-1)T)$ | $2\pi/5$ | $-8\pi/5 = -2\pi + 2\pi/5$ | $3\pi/5$ | $2\pi/5$ |
| $\phi_c(kT) - \phi_c((k-1)T)$ | $2\pi/5$ | $2\pi/5$ | $3\pi/5$ | $2\pi/5$ |

It can be seen that at the sample k=3 for the phase difference of the modulo $2\pi$ divided phase $\phi(kT)$ calculated with the CORDIC-algorithm an error of $-2\pi$ occurs. In state of the art demodulators this error gets eliminated by a modulo $2\pi$ operation carried out by an overflow in a fixed point implementation. Therefore, the valid range of the phase difference $\phi(kT)-\phi((k-1)T)$ is limited in a fixed point implementation to $[-\pi, \ldots, \pi]$. So the value $-8\pi/5=-2\pi+2\pi/5$ causes an overflow and therefore the wrong value $-8\pi/5$ is modulo $2\pi$ divided to the correct value $2\pi/5$.

The object underlying the present invention is to improve the signal to noise ratio of the demodulated signal for carrier to noise ratios below the fm-threshold.

According to the present invention, this object is solved by unwrapping the modulo $2\pi$ divided phase $\phi(kT)$ calculated during the transformation from cartesian coordinates to polar coordinates and the detection and elimination of phase jumps in the unwrapped phase to generate a corrected phase that is then used in the differentiation stage.

Further objects, features and advantages of the present invention will be better understood from the following analyzation of the state of the art demodulator and detailed description of preferred embodiments according to the present invention which are only to be seen as examples taken in conjunction with the accompanying drawings, wherein:

FIG. 1 shows the principal block diagram of an fm-demodulator according to an embodiment of the present invention;

FIG. 2 shows the absolute phase $\phi_c(kT)$, i.e. the ideal phase having an infinite carrier to noise ratio, and the phase $\phi_u(kT)$ calculated by the transformation from the cartesian coordinates into polar coordinates in an unwrapped state with a carrier to noise ratio of 10 dB of a frequency modulated signal, here, the modulating signal is a stereo-multiplex-signal with music information as it is used in fm-broadcasting;

Figure 1:
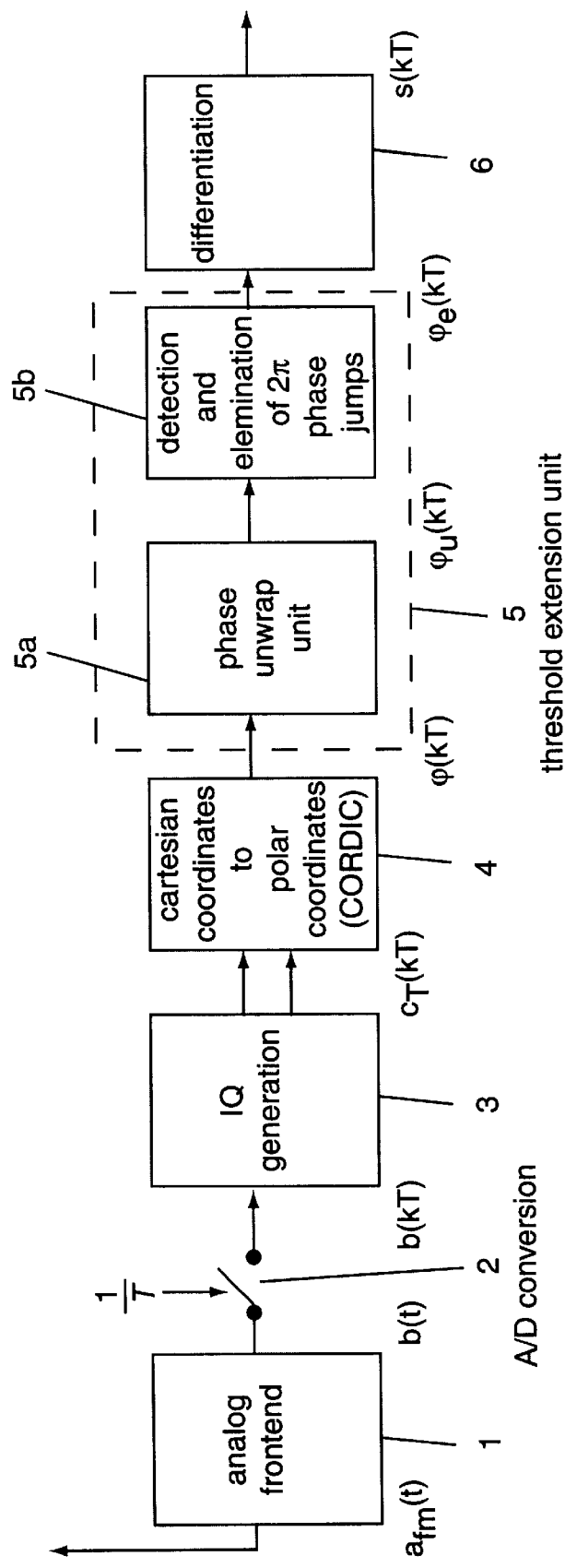
Figure 10:
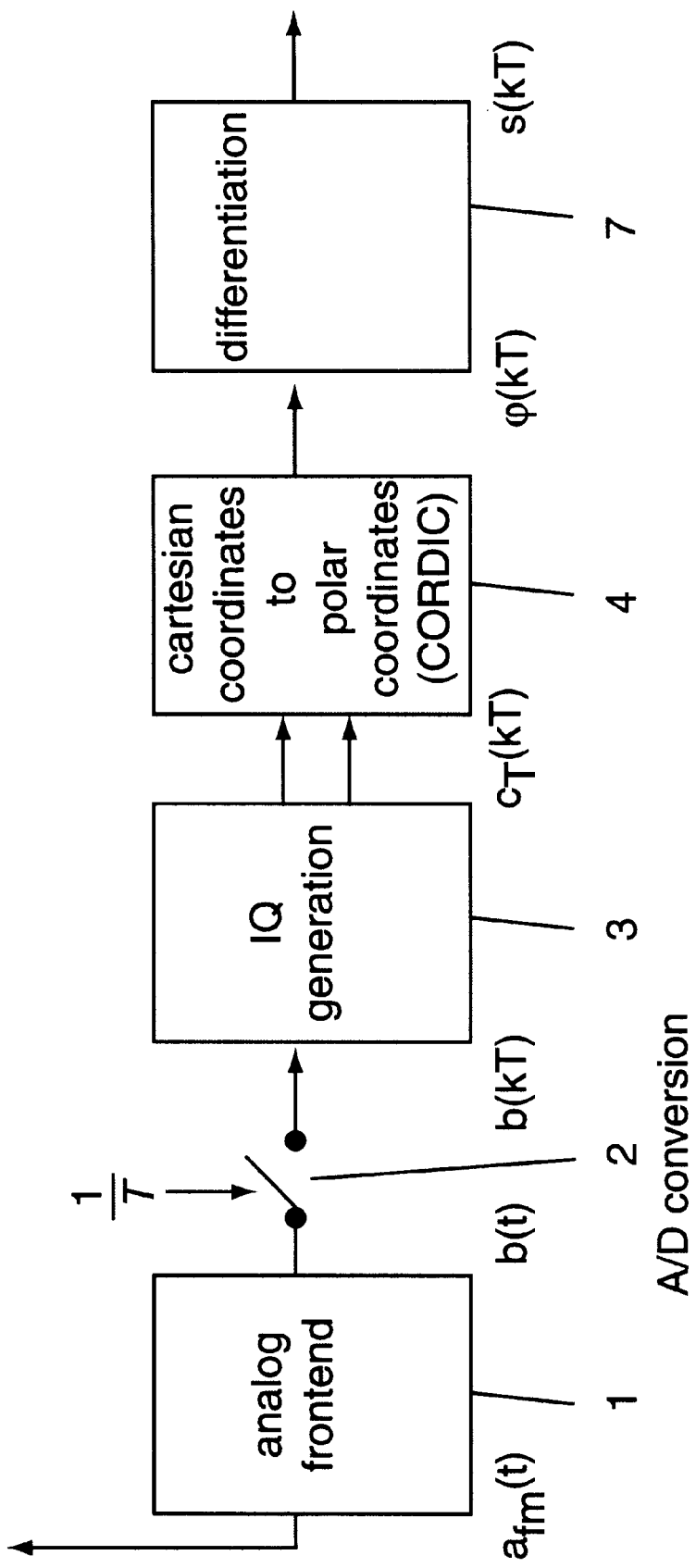
FIG. 10 shows a block diagram of a state of the art fm-demodulator which makes use of the CORDIC-algorithm.
Figure 11:
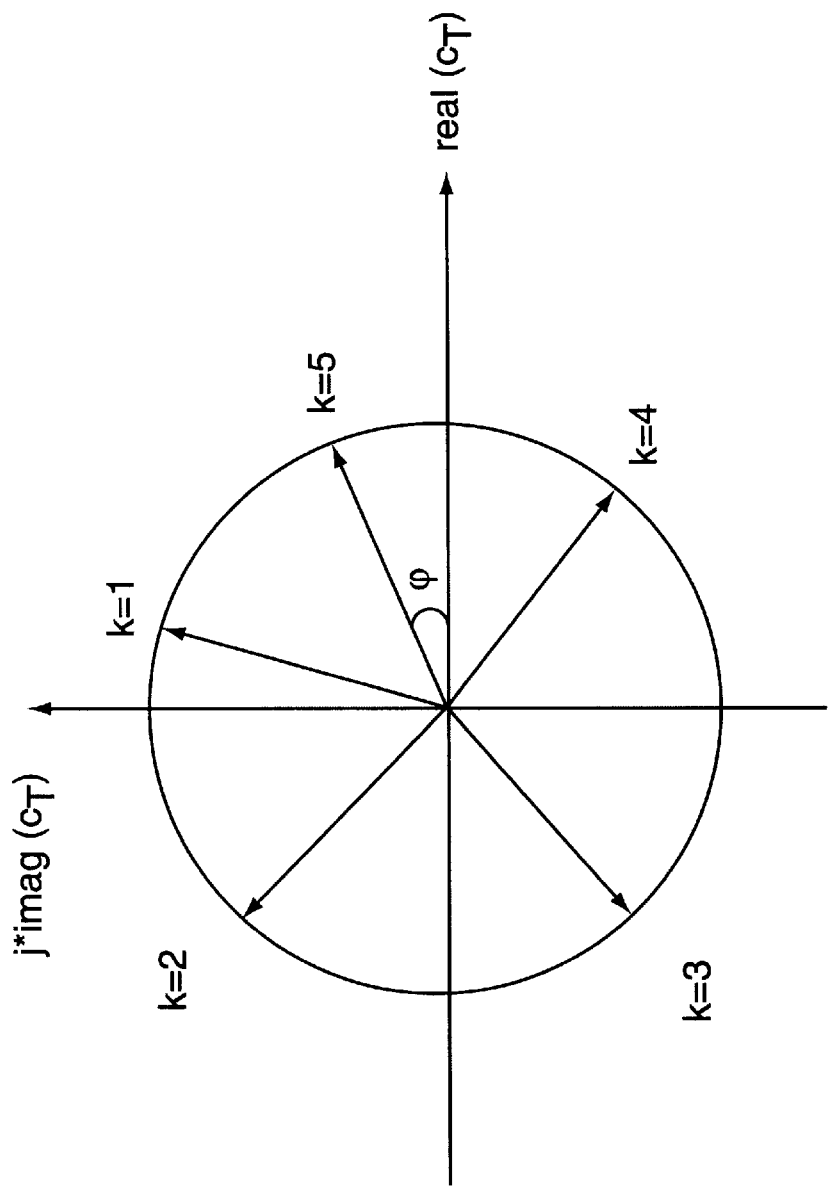
FIG. 11 shows the complex plane with the pointers of 5 samples of the complex baseband signal $c_T(kT)$.

FIG. 1 shows the principal block diagram of a device for digitally demodulating a frequency modulated signal $a_{fm}(t)$ according to an embodiment of the present invention. Blocks having the same functionality as those shown and described in connection with the prior art device shown in FIG. 10 are denoted with the same reference signs. The differentiation block 7 of the state of the art device produces an overflow which is not allowed according to the present invention. Therefore, the device according to the present invention includes a differentiation block 6 not producing an overflow. Additionally to the prior art device the demodulator according to the present invention comprises a digital threshold extension unit 5 receiving the phase $\phi(kT)$ from the CORDIC block 4 that calculates a corrected phase $\phi_e(kT)$ which is then input to the differentiation block 6. An additional digital IF-filter can be placed in front of the CORDIC block 4. The IF-filter is necessary for the neighbour channel suppression.

According to the embodiment of the present invention the digital threshold extension unit 5 comprises a phase unwrap unit 5a to calculate the unwrapped phase $\phi_u(kT)$ from the phase $\phi(kT)$ output of the CORDIC block 4 and a correction unit 5b to detect and eliminate $2\pi$ phase jumps in the unwrapped phase $\phi_u(kT)$ and to output a corrected phase $\phi_e(kT)$ which is then input into the differentiation block 6. The unwrapped phase $\phi_u(kT)$ is calculated as the absolute phase which is not limited to the range $[-\pi, \ldots, \pi]$.

The fm-demodulation done with the unwrapped phase $\phi_u(kT)$ without the correction unit 5b results in exactly the same values as the state of the art fm-demodulator described before. This behavior is independent of the carrier to noise ratio (CNR) of the fm-signal.

Figure 2:
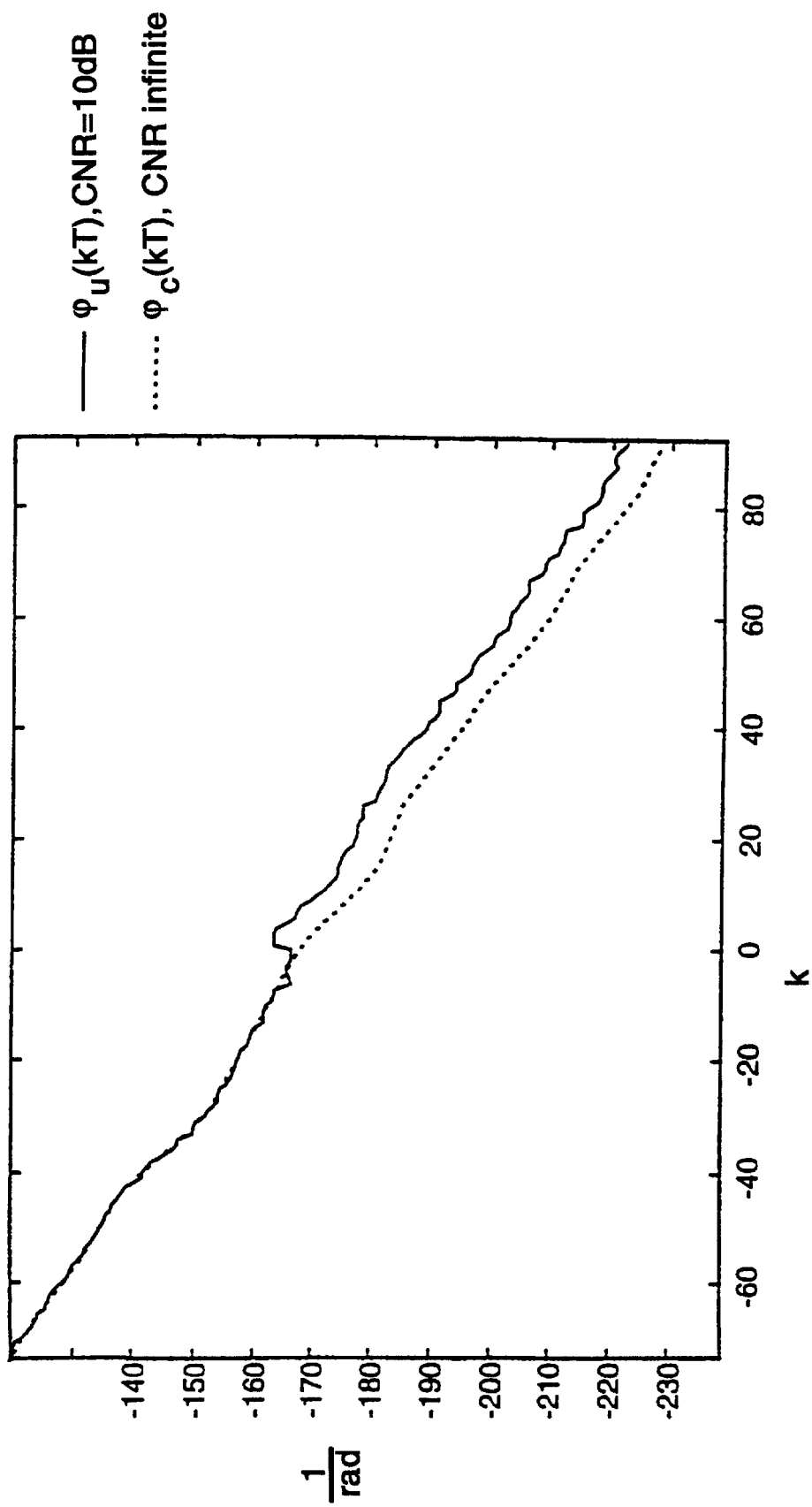

FIG. 2 shows the absolute phase $\phi_c(kT)$ of a frequency modulated stereo-multiplex signal having a falling slope which is calculated with an infinite carrier to noise ratio. This absolute phase $\phi_c(kT)$ is shown with a dotted line. FIG. 2 shows also the corresponding unwrapped phase $\phi_u(kT)$ with a carrier to noise ratio of 10 dB. This unwrapped phase $\phi_u(kT)$ is shown with a solid line and it can clearly be seen that it includes a phase jump of $2\pi$ in regard to the absolute phase that is beginning with the value of k=0.

The $2\pi$ phase jump of the unwrapped phase signal $\phi_u(kT)$ at sample k=0 is typical for carrier to noise ratios below the fm-threshold. After the differentiation this phase jump produces a noise peak in the demodulated signal. Such a noise peak would also occur when the differentiation of the modulo $2\pi$ divided phase $\phi(kT)$ of the state of the art fm-demodulator is performed. These peaks in the frequency demodulated signal s(kT) are the reason for the dramatically decreased signal to noise ratio below the fm-threshold.

These $+2\pi$ phase jumps of the unwrapped phase $\phi_u(kT)$ appear in the normal mode of operation of the fm-receiver only at the falling slope of $\phi_u(kT)$. Phase jumps with the value $-2\pi$ appear only at the rising slope.

According to the present invention such phase jumps are detected and eliminated to obtain a fm-demodulator having a considerably reduced number of noise peaks in the demodulated signal and therefore a better signal to noise ratio (SNR) below the fm-threshold than the state of the art fm-demodulators.

Figure 3:
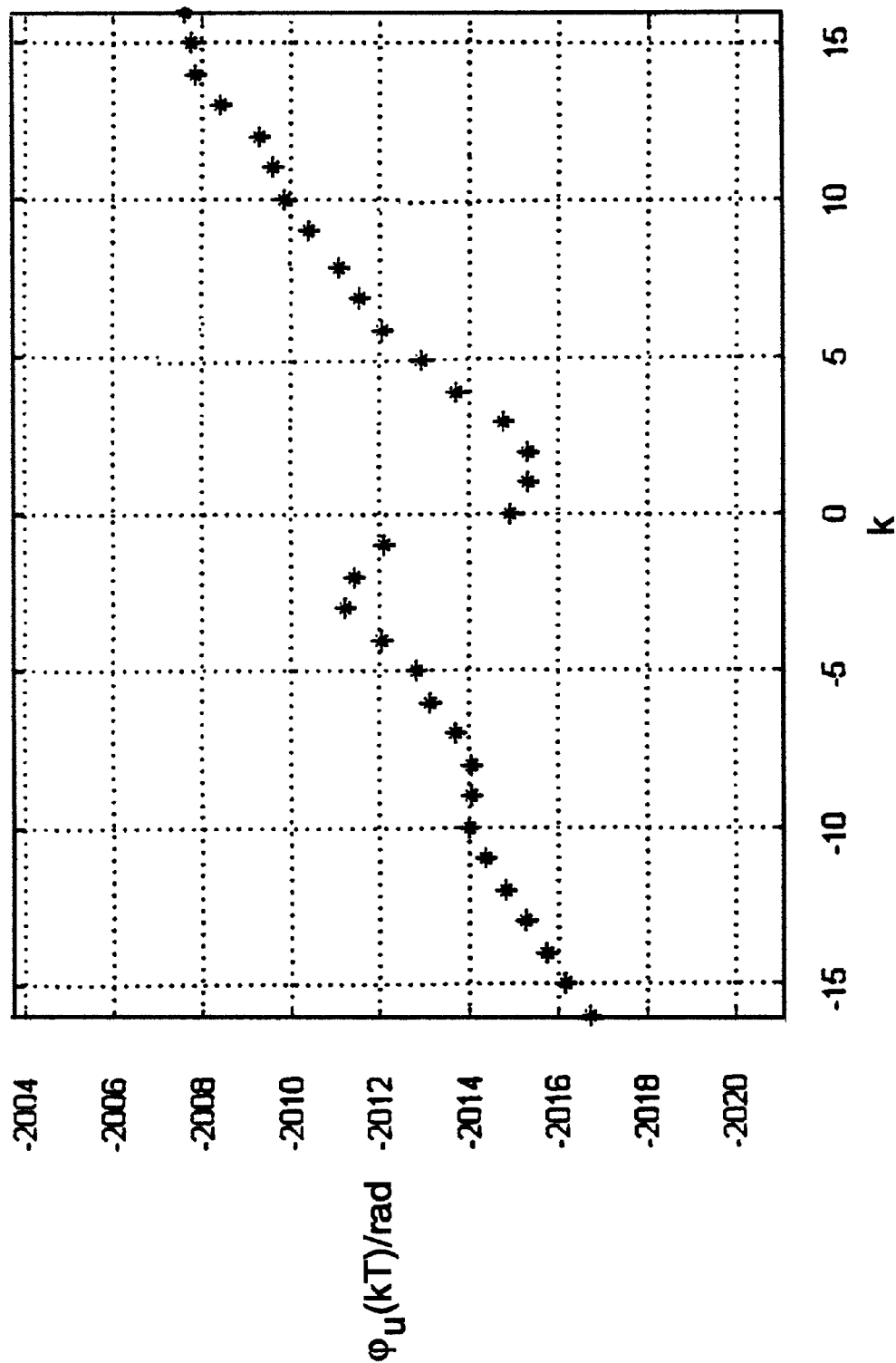
FIG. 3 shows another unwrapped phase signal $\phi_u(kT)$ with a carrier to noise ratio of 10 dB of a frequency modulated signal in an enlarged scale, here, the modulating signal s(t) is again a stereo-multiplex-signal with music information.

FIG. 3 shows an enlarged view of the unwrapped phase $\phi_u(kT)$ with a carrier to noise ratio of 10 dB of a frequency modulated stereo-multiplex signal, this time having a rising slope. This unwrapped phase signal $\phi_u(kT)$ has a phase jump of $-2\pi$ at the sample k=0.

Figure 4:
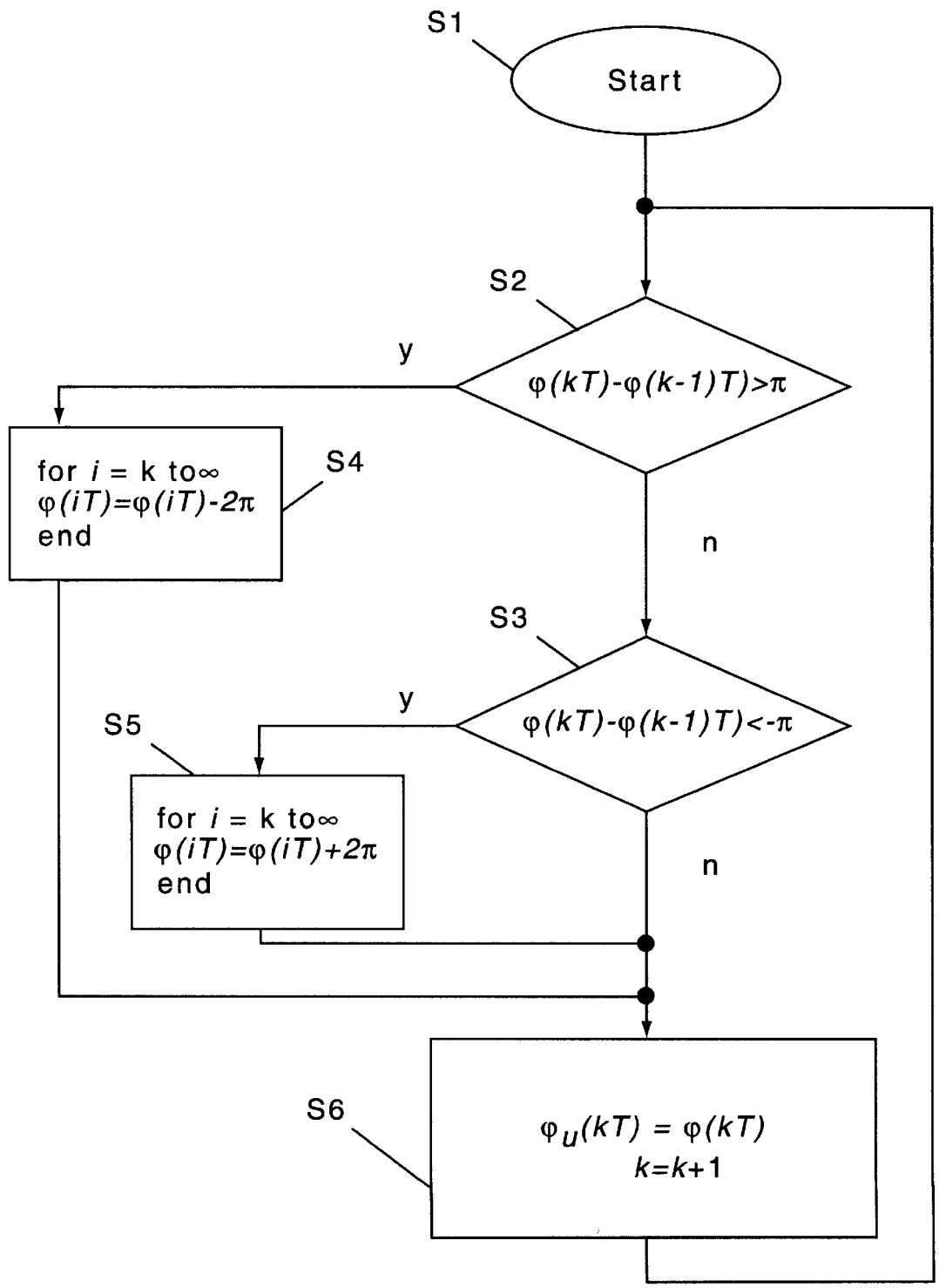
FIG. 4 shows a flow chart for the generation of the unwrapped phase $\phi_u(kT)$.

FIG. 4 shows a principal flowchart how the unwrapped phase $\phi_u(kT)$ is calculated from the modulo $2\pi$ divided phase $\phi(kT)$ according to the present invention. After the start in step S1 it is checked in step S2 whether the difference of the phase $\phi(kT)$ at sample k and the phase $\phi((k-1)T)$ at the preceding sample to sample k exeeds $\pi$. If this is not the case, then it will be checked in step S3 if this difference is below $-\pi$. If this is also not the case, i.e. if said difference is within the range $[-\pi, \ldots, \pi]$, then the unwrapped phase $\phi_u(kT)$ is set to the phase $\phi(kT)$. Then the algorithm is set forth with step S2 for the next sample k=k+1.

If, on the other hand, it is determined in step S2 that said difference in-between the phase $\phi(kT)$ at sample k and the phase $\phi((k-1)T)$ of the preceding sample of sample k exeeds $\pi$ then $2\pi$ will be subtracted from the actual sample of the phase $\phi(kT)$ and all following samples of the phase in a step S4 before the algorithm is set forth with step S6.

In the same manner $2\pi$ will be added to the actual sample of the phase $\phi(kT)$ and all following samples of the phase in a step S5 if the difference in-between the actual sample of the phase $\phi(kT)$ and the preceeding sample of the phase $\phi((k-1)T)$ falls below $-\pi$ in step S3 before the algorithm will be set forth with step S6.

The phase jumps of the unwrapped phase $\phi_u(kT)$ are detected and eliminated with the correction unit 5b shown in FIG. 1 which serves as detection and elimination block that checks the unwrapped phase signal $\phi_u(kT)$ for positive phase jumps at the falling slope and negative phase jumps at the rising slope in combination with an interpolation before and after the possible phase jump. If a phase jump is detected, the block eliminates the phase jump by adding or subtracting $2\pi$ to the following samples of the unwrapped phase signal $\phi_u(kT)$.

The first criterion for a detection of a phase jump is the rising or falling slope. This criterion can be determined in combination with an interpolation before and after the test sample to be checked for the occurance of a phase jump. This interpolation is explained in the following.

The interpolation makes use of the spectral distribution of the frequency modulated signal in combination with the high sampling rate of the unwrapped phase signal $\phi_u(kT)$. In case of fm-stereo-broadcasting, the stereo-multiplex-signal s(t) contains mainly low frequency components. The sampling rate of the demodulator has to be chosen high, e.g. 1/T>300 kHz, due to the bandwidth of the baseband signal $c_T(kT)$. Therefore, the phase jump has a stronger gradient than the absolute phase $\phi_c(kT)$ and can be detected.

As mentioned before, FIG. 3 shows the unwrapped phase $\phi_u(kT)$ of the fm-demodulated signal with a phase jump of $-2\pi$ at sample k=0. For the interpolation at sample k the gradient before k, named $grad_{bef}$ $\phi_u(kT)$, and after the sample k, in the following named $grad_{aft}$ $\phi_u(kT)$, has to be calculated. This should be done by averaging the gradient of more than one sample, because the unwrapped phase signal $\phi_u(kT)$ is disturbed by noise. Also, the samples in the direct neighbourhood of the phase jump should not be used for interpolation, because these samples are disturbed by the phase jump, as it can be seen in FIG. 3. Therefore, the gradient before k and after k is calculated by the following formula:

$$grad_{bef}(kT) = \frac{\varphi_U((k-o)T) - \varphi_U((k-o-p)T)}{p} \quad (7a)$$

$$grad_{aft}(kT) = \frac{\varphi_U((k+q+r-1)T) - \varphi_U((k+r-1)T)}{q}$$

where p and q denote the number of samples used for the averaging and o and r denote the minimal distance of the samples used for calculating the gradient from k. If for example the gradient before and after k is calculated by averaging p=q=8 samples beginning with a distance form k of o=r=4 samples, the gradient will be calculated with the following formula:

$$grad_{bef}(kT) \approx \frac{\varphi_U((k-4)T) - \varphi_U((k-12)T)}{8} \quad (7b)$$

$$grad_{aft}(kT) \approx \frac{\varphi_U((k+11)T) - \varphi_U((k+3)T)}{8}$$

The gradient (7) is now used for the interpolation. The error of the interpolation of the unwrapped phase $\phi_u(kT)$ is calculated at the sample k with the gradient before k with the following equation:

$$\varphi_{errbef_{d,e}}(kT) = \quad (8a)$$
$$\varphi_U((k-d-1)T) + (d+e+1) \cdot grad_{bef}(kT) - \varphi_U((k+e)T)$$

wherein d and e denote the distance of the interpolated samples from the actual sample k. In the following, d and e are supposed to be the same values (d=e), but this is not necessary.

Since the samples in the direct neighbourhood of the phase jump at sample k are disturbed and should therefore not be used for the interpolation of the unwrapped phase, d and e should be choosen $\geq 2$.

For improving the reliability of the interpolation error, the interpolation should be done for more than one sample. The following example shows the interpolation error $\varphi_{errbef_{d,e}}(kT)$ for d=e=2, 3, 4, 5:

$$\varphi_{errbef_{2,2}}(kT) = \varphi_U((k-3)T) + 5 \cdot grad_{bef}(kT) - \varphi_U((k+2)T) \quad (8b)$$

$$\varphi_{errbef_{3,3}}(kT) = \varphi_U((k-4)T) + 7 \cdot grad_{bef}(kT) - \varphi_U((k+3)T)$$

$$\varphi_{errbef_{4,4}}(kT) = \varphi_U((k-5)T) + 9 \cdot grad_{bef}(kT) - \varphi_U((k+4)T)$$

$$\varphi_{errbef_{5,5}}(kT) = \varphi_U((k-6)T) + 11 \cdot grad_{bef}(kT) - \varphi_U((k+5)T)$$

As another point for approving the reliability of the interpolation, it should also be done with the gradient after the phase jump. Then, the phase error $\varphi_{erraft_{f,g}}(kT)$ will be calculated by the following interpolation:

$$\varphi_{erraft_{f,g}}(kT) = \quad (9a)$$
$$\varphi_U((k-f-1)T) + (f+g+1) \cdot grad_{aft}(kT) - \varphi_U((k+g)T)$$

wherein f and g denote the distance of the interpolated samples from k, f and g are again supposed to be the same value (f=g), even if this is not necessary.

Because of the unreliability of the neighbour samples of the phase jump at k, the minimal distance of the interpolated samples from k should again be choosen f, $g \geq 2$. The following example shows the interpolation error $\varphi_{erraft_{f,g}}(kT)$ for f=g=2, 3, 4, 5:

$$\varphi_{erraft_{2,2}}(kT) = \varphi_U((k-3)T) + 5 \cdot grad_{aft}(kT) - \varphi_U((k+2)T) \quad (9b)$$

$$\varphi_{erraft_{3,3}}(kT) = \varphi_U((k-4)T) + 7 \cdot grad_{aft}(kT) - \varphi_U((k+3)T)$$

$$\varphi_{erraft_{4,4}}(kT) = \varphi_U((k-5)T) + 9 \cdot grad_{aft}(kT) - \varphi_U((k+4)T)$$

$$\varphi_{erraft_{5,5}}(kT) = \varphi_U((k-6)T) + 11 \cdot grad_{aft}(kT) - \varphi_U((k+5)T)$$

The addition of all interpolations results in the total interpolation error:

$$\varphi_{err}(kT) = \sum_{d=d_0}^{d_{max}} \varphi_{errbef_{d,e}}(kT) + \sum_{f=f_0}^{f_{max}} \varphi_{erraft_{f,g}}(kT) \quad (10a)$$

$$= \sum_{d=d_0}^{d_{max}} \varphi_u((k-d-1)T) + (d+e+1)grad_{bef}(kT) -$$

$$\varphi_u((k+e)T) + \sum_{f=f_0}^{f_{max}} \varphi_u((k-f-1)T) +$$

$$(f+g+1)grad_{aft}(kT) - \varphi_u((k+g)T),$$

wherein $d_0$ and $f_0$ denote the the minimal and $d_{max}$ and $f_{max}$ denote the maximal distance of the interpolated samples from k. In the above examples with $d_0=f_0=2$ and $d_{max}=f_{max}=5$ when the interpolation is done with $(d_{max}-d_0+f_{max}-f_0+2)=8$ samples, the addition of all interpolations result in the total interpolation error:

$$\varphi_{err}(kT) = 2 \cdot \{\varphi_U((k-3)T + \varphi_U((k-4)T) + \varphi_U((k-5)T) + \quad (10b)$$
$$\varphi_U((k-6)T)) - 2 \cdot (\varphi_U((k+2)T) +$$
$$\varphi_U((k+3)T) + \varphi_U((k+4)T) + \varphi_U((k+5)T)) +$$
$$32 \cdot (grad_{bef}(kT) + grad_{aft}(kT))$$
$$= 2 \cdot (\varphi_U((k-3)T) + \varphi_U((k-4)T) + \varphi_U((k-5)T) +$$
$$\varphi_U((k-6)T)) - 2 \cdot (\varphi_U((k-6)T) + \varphi_U((k+2)T +$$
$$\varphi_U((k+3)T) + \varphi_U((k+4)T) + \varphi_U((k+5)T)) +$$
$$4 \cdot (\varphi_U((k-4)T) - \varphi_U((k-12)T) +$$
$$\varphi_U((k+11)T) - \varphi_U((k+3)T))$$

In case of an ideal phase jump, the total interpolation error can be calculated by the following equation:

$$\phi_{err_{ideal}} = 2\pi \cdot (d_{max} - d_0 + f_{max} - f_0 + 2) \quad (11a)$$

In the above example with $d_0 = f_0 = 2$ and $d_{max} = f_{max} = 5$ the total interpolation error would result in $$\phi_{err_{ideal}} = 2\pi \cdot 8 = 50{,}27 \quad (11b)$$

On the other hand, practical experiments have proven, that an interpolation error threshold of $$\phi_{err,thr} \approx \frac{1}{2} \cdot \phi_{err_{ideal}} \quad (12)$$

results in good performance at a samplingrate 1/T of approximately 410 kHz. For the above example, $\phi_{err,thr} = 26$ was choosen.

As described before, the unwrapped phase $\phi_u(kT)$ has to be checked for phase jumps. Since the phase jump with the value $+2\pi$ appears only at the falling slope of the unwrapped phase signal $\phi_u(kT)$, the phase jump can be detected in the following way. The detection of the falling slope can be done with the gradient of the unwrapped phase. In the following, the gradient before kT $grad_{bef}(kT)$ is chosen for the check of this condition ($grad_{bef}(kT) < -grad_{thr}$), it is also possible to chose the gradient after kT ($grad_{aft}(kT) < -grad_{thr}$) or a combination of both ($grad_{bef}(kT) + grad_{aft}(kT) < -grad_{thr}$), wherein $grad_{thr}$ is a threshold value preferably equal to zero or a small value near to zero.

$$(\phi_U(kT) - \phi_U((k-1)T > \phi_{thr1}(kT)) \quad (13)$$

AND $$(grad_{bef}(kT) < -grad_{thr})$$

AND $$(\phi_{err}(kT) < -\phi_{err,thr})$$

The phase jump is not always such a sharp jump as can be seen from FIGS. 2 and 3. Some phase jumps extend over more than one sample so that the following condition is included in the check for the phase jumps according to the present invention.

$$\phi_U(kT) - \phi_U((k-2)T) > \phi_{thr2}(kT) \quad (14)$$

With equations (13) and (14) it follows for the condition to detect a phase jump at the falling slope of the unwrapped phase signal $\phi_u(kT)$:

$$[(\phi_U(kT) - \phi_U((k-1)T) > \phi_{thr1}(kT)) \text{ OR } (\phi_U(kT) - \phi_U((k-2)T) > \phi_{thr2}(kT))] \quad (15)$$

AND $$(grad_{bef}(kT) < -grad_{thr})$$

AND $$(\phi_{err}(kT) < -\phi_{err,thr})$$

The condition for the rising slope of $\phi_u(kT)$ can be described in a similar way:

$$[(\phi_U(kT) - \phi_U((k-1)T) < -\phi_{thr1}(kT)) \text{ OR } (\phi_U(kT) - \phi_U((k-2)T) < -\phi_{thr2}(kT))] \quad (16)$$

AND $$(grad_{bef}(kT) > grad_{thr})$$

AND $$(\phi_{err}(kT) > \phi_{err,thr})$$

The check for the rising slope $grad_{bef}(kT) > grad_{thr}$ can again be replaced by $grad_{aft}(kT) > grad_{thr}$ or $(grad_{bef}(kT) + grad_{aft}(kT)) > grad_{thr}$.

Practical experience have proven that the thresholds $\phi_{thr1}$ and $\phi_{thr2}$ and $grad_{thr}$ denoted in the above formulas (15) and (16) should be chosen at a sampling rate 1/T of approximately 410 kHz as follows:

$$\phi_{thr1} \approx 1{,}5 \quad (17)$$

$$\phi_{thr2} \approx 2$$

$$grad_{thr} \approx 0$$

Figure 5:
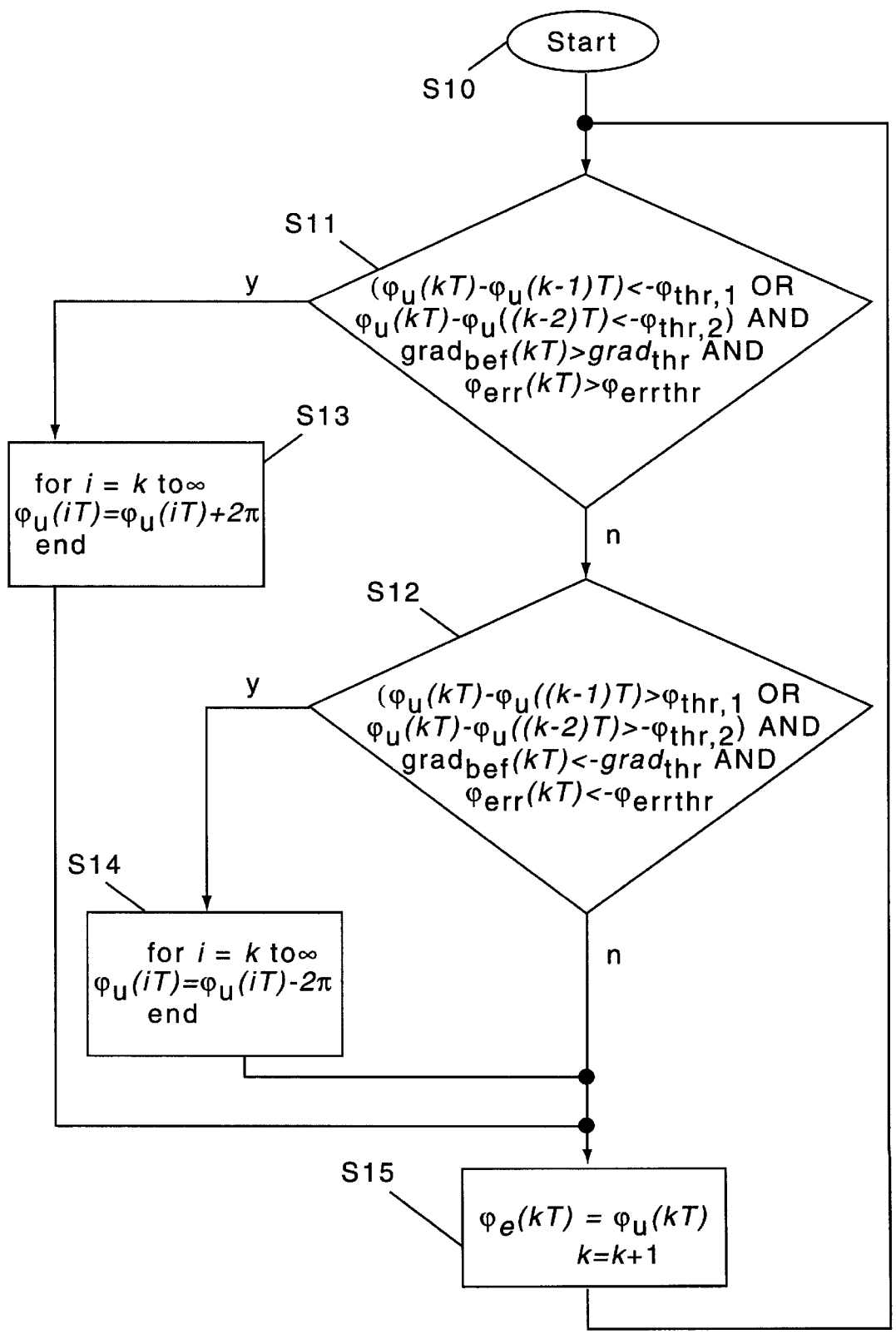
FIG. 5 shows the flow chart of the principal idea of the detection and elimination of the destortion of the unwrapped phase $\phi_u(kT)$ shown in FIGS. 2 and 3.

The flow chart of the detection and elimination is shown in FIG. 5. This flow chart includes the above-discussed check for positive phase jumps at the falling slope of $\phi_u(kT)$ and negative phase jumps at the rising slope of $\phi_u(kT)$ in combination with an interpolation before and after the phase jump. If a phase jump is detected, the block eliminates the phase jump by adding or subtracting $2\pi$ to the actual sample and the following samples of the unwrapped phase signal $\phi_u(kT)$.

After the start in step S10, condition (16) will be checked in step S11. If this condition is not satisfied, condition (15) will be checked in step S12. If this condition is also not satisfied, i.e. if no phase jump has been detected, the corrected phase $\phi_e(kT)$ will be set to the value of the unwrapped phase $\phi_u(kT)$ in step S15. Thereafter, the algorithm is repeated beginning from step S11 with the next sample k=k+1.

If, on the other hand, it is in step S11 determined that condition (16) is satisfied then $2\pi$ will be added to the actual sample of the unwrapped phase $\phi_u(kT)$ and all following samples before step S15 is performed. Likewise, if it is determined in step S12 that condition (15) is satisfied then $2\pi$ will be subtracted from the actual sample of the unwrapped phase $\phi_u(kT)$ and all following samples before step S15 is performed.

Figure 6:
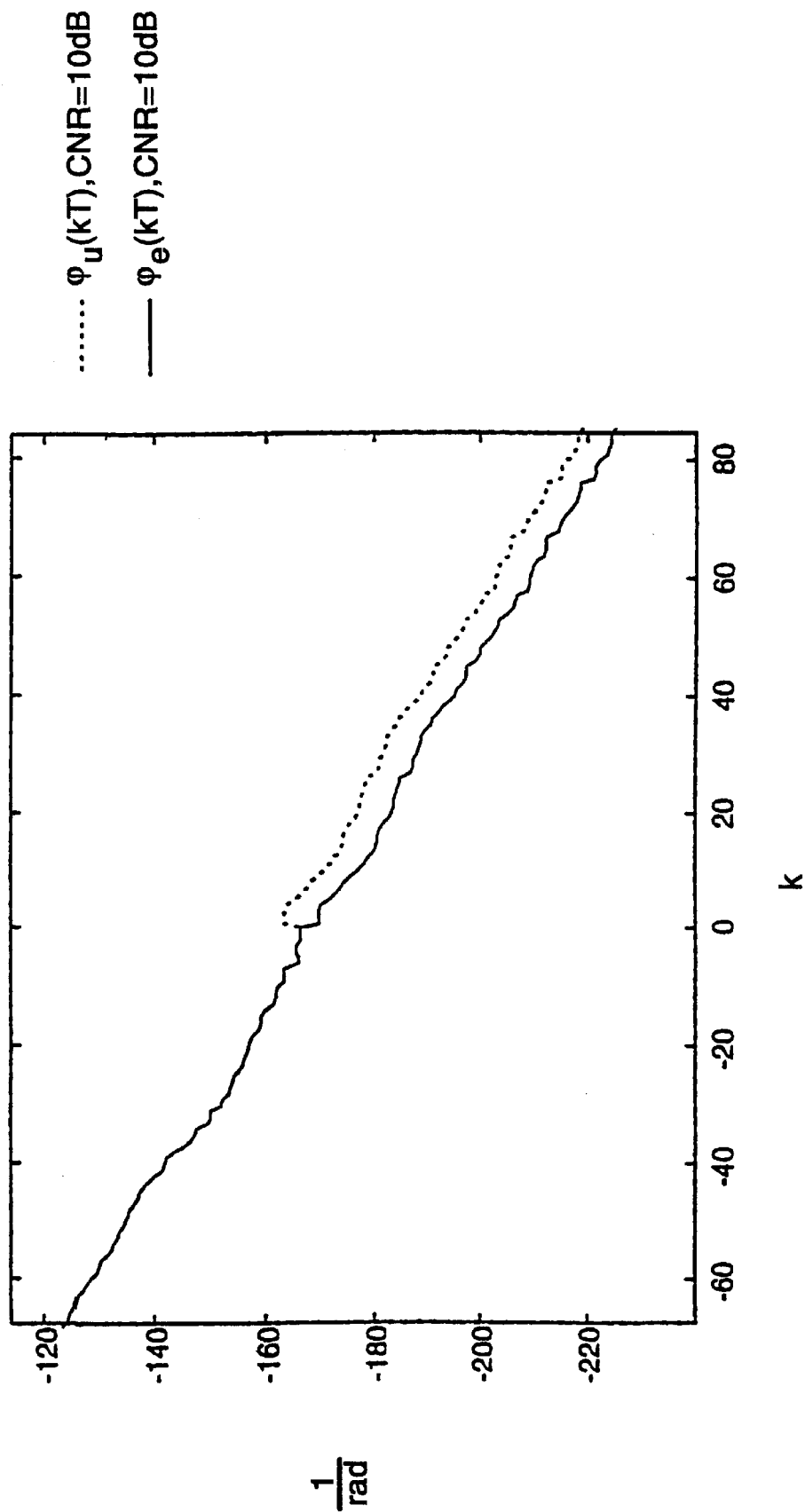
FIG. 6 shows the unwrapped phase $\phi_u(kT)$ with a carrier to noise ratio of 10 dB and the phase $\phi_e(kT)$ corrected according to the present invention.

FIG. 6 shows the unwrapped phase $\phi_u(kT)$ and the phase with eliminated phase jumps $\phi_e(kT)$ both with a carrier to noise ratio of 10 dB after the correction unit 5b. It can clearly be seen that the phase with eliminated phase jumps $\phi_e(kT)$ corresponds better to the absolute phase $\phi_e(kT)$ with infinite carrier to noise ratio shown in FIG. 2 then the unwrapped phase $\phi_u(kT)$ without the detection and elimination of the $2\pi$ phase jumps.

The phase with eliminated phase jumps $\phi_e(kT)$ can now be differentiated without the noise caused by the fm-threshold. This means that a high gain in the signal to noise ratio of the fm-demodulated signal below the fm-threshold can be achieved.

In a second embodiment according to the present invention it is taken into consideration that it is not very easy to implement the adding or subtracting of $2\pi$ from the actual sample and all following samples of the phase or the unwrapped phase, i.e. it is not in an easy way possible e.g. to solve the equation:

$$\text{for i=k to } \infty \qquad (18)$$

$$\phi(iT) = \phi(iT) - 2\pi$$

$$\text{end}$$

shown in step S4 of FIG. 4.

Therefore, according to the second embodiment of the present invention, the window of calculating the unwrapped phase $\phi_u(kT)$ is limited to the values that are needed for the algorithm. In the above examples the window is limited to the range [k−o−p . . . k+q+r−1], e.g. [k−12 . . . k+11]. The calculation of the unwrapped phase $\phi_u(kT)$ is done with the helper variable w, which contains information about the addition or subtraction of $2\pi$ to the modulo $2\pi$ divided phase $\phi(kT)$:

$$w(kT) = \begin{cases} -1 & \varphi(kT) - \varphi((k-1)T) > \pi \\ 1 & \text{for } \varphi(kT) - \varphi((k-1)T) < -\pi \\ 0 & \text{else} \end{cases} \qquad (19)$$

With this helper variable w(kT) the unwrapped phase $\phi_u(kT)$ can be calculated in a window beginning at sample (k−N)T in the following way:

$$\varphi_u((k-N)T) = \varphi((k-N)T) \qquad (20a)$$
$$\varphi_u((k-N+1)T) = \varphi((k-N+1)T) + 2\pi w((k-N+1)T)$$
$$\ldots$$
$$\varphi_u((k-N+v)T) = \varphi((k-N+v)T) + 2\pi \sum_{i=1}^{v} w((k-N+i)T),$$

wherein N denotes the beginning of the window for unwrapping the phase $\phi(kT)$ and v denotes the distance of the sample (k−N+v)T from the beginning (k−N)T of the window for unwrapping the phase.

The above example with N=o+p=12 follows.

$$\varphi_u((k-12)T) = \varphi((k-12)T) \qquad (20b)$$
$$\varphi_u((k-11)T) = \varphi((k-11)T) + 2\pi w((k-11)T)$$
$$\varphi_u((k-10)T) = \varphi((k-10)T) + 2\pi(w((k-11)T) + w((k-10)T))$$
$$\ldots$$
$$\varphi_u((k-12+v)T) = \varphi((k-12+v)T) + 2\pi \sum_{i=1}^{v} w(k-12+i),$$

With this equation follows for the example of equation (7b):

$$grad_{bef}(kT) = \frac{1}{8}(\varphi_u((k-4)T) - \varphi_u((k-12)T)) \qquad (21)$$

$$= \frac{1}{8}(\varphi((k-4)T) - \varphi((k-12)T) +$$

$$2\pi[w((k-11)T) + w((k-10)T) + \ldots + w((k-4)T)])$$

Converting equation (10b) into another representation results in $$\frac{\varphi_{err}(kT)}{2} = \varphi_u((k-3)T) + \varphi_u((k-4)T) + \varphi_u((k-5)T) + \qquad (22)$$
$$\varphi_u((k-6)T) - (\varphi_u((k+2)T) + \varphi_u((k+3)T) +$$
$$\varphi_u((k+4)T) + \varphi_u((k+5)T)) +$$
$$16 \cdot grad_{aft}(kT) + 16 \cdot grad_{bef}(kT)$$
$$= \varphi_u((k-3)T) + \varphi_u((k-4)T) + \varphi_u((k-5)T) +$$
$$\varphi_u((k-6)T) - (\varphi_u((k+2)T) + \varphi_u((k+3)T) +$$
$$\varphi_u((k+4)T) + \varphi_u((k+5)T)) + 2 \cdot (\varphi_u((k+11)T) -$$
$$\varphi_u((k+3)T)) + 16 \cdot grad_{bef}(kT)$$

With another window definition for the calculation of the unwrapped phase with N=6

$$\varphi_u((k-6)T) = \varphi((k-6)T) \qquad (23)$$
$$\varphi_u((k-5)T) = \varphi((k-5)T) + 2\pi w(k-5)$$
$$\ldots$$
$$\varphi_u((k-6+v)T) = \varphi((k-6+v)T) + 2\pi \sum_{i=1}^{v} w(k-6+v)$$

follows:

$$\frac{\varphi_{err}(kT)}{2} = \varphi((k-3)T) + \varphi((k-4)T) + \qquad (24)$$
$$\varphi((k-5)T) + \varphi((k-6)T) + 2 \cdot \varphi((k+11)T) -$$
$$\varphi((k+2)T) - 3\varphi((k+3)T) - \varphi((k+4)T) - \varphi((k+5)T) +$$
$$2\pi \cdot \{-w((k-5)T) - 2w((k-4)T) - 3w((k-3)T) - 4w((k-2)T) -$$
$$4w((k-1)T) - 4w(kT) - 4w((k+1)T) - 4w((k+2)T) -$$
$$3w((k+3)T) + w((k+5)T) + 2w((k+6)T) +$$
$$2w((k+7)T) + 2w((k+8)T) + 2w((k+9)T) +$$
$$2w((k+10)T) + 2w((k+11)T)\} + 16 \cdot grad_{bef}(kT)$$

The equations of the conditions shown in equation (15), (16) and FIG. 5 can be replaced with the following equations:

$$\phi_u(kT) - \phi_u((k-1)T) = \phi(kT) - \phi((k-1)T) + 2\pi w(kT) \qquad (25)$$

$$\phi_u(kT) - \phi_u((k-2)T) = \phi(kT) - \phi((k-2)T) + 2\pi(w(kT) + w((k-1)T))$$

The flow chart of the above example that is shown in FIG. 5 can be simplified with equations (21), (24) and (25) as follows when the condition determined in step S11 is replaced by the following condition:

$$\begin{pmatrix} \varphi(kT) - \varphi((k-1)T) + 2\pi w(kT) < -\varphi_{thr1} \text{ or} \\ \varphi(kT) - \varphi((k-2)T) + 2\pi(w(kT) + w((k-1)T)) < -\varphi_{thr2} \end{pmatrix} \text{AND} \qquad (26)$$

$$grad_{bef} > grad_{thr} \text{ AND } \varphi_{err} > \varphi_{err,thr}$$

the condition determined in step S12 is replaced with the following condition $$(\phi(kT)-\phi((k-1)T)+2\pi w(kT)>\phi_{thr1} \text{ OR } \phi(kT)-\phi((k-2)T)+2\pi(w(kT)+w((k-1)T))>\phi_{thr2}) \quad (27)$$

AND $$grad_{bef} < -grad_{thr}$$

AND $$\phi_{err} < -\phi_{err,thr}$$

and the differentiation for generating the frequency demodulated signal s(kT) is included in the following equation:

$$s(kT)=\phi(kT)-\phi((k-1)T)+2\pi w(kT) \quad (28)$$

$$k=k+1$$

in step S15.

Figure 7:
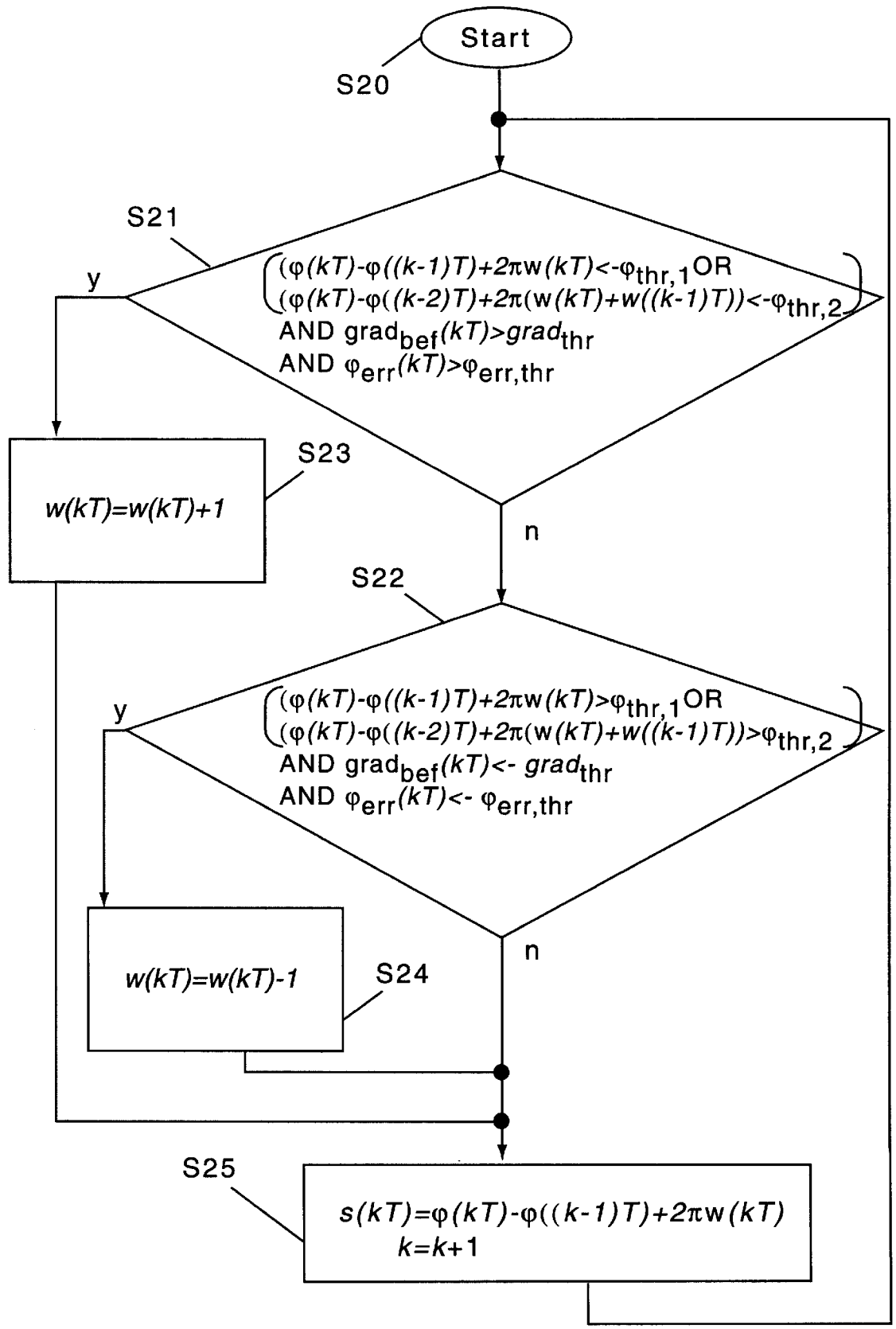
FIG. 7 shows a flowchart of the blocks for unwrapping the phase, detection and elimination of the distortions and differentiation according to a second embodiment of the present invention.

FIG. 7 shows the flow chart corresponding to the process performed in the second embodiment according to the present invention. After the beginning of the process in step S20 the condition (26) is determined in step S21. If this condition is not satisfied then condition (27) is checked in step S22. If this condition is also not satisfied then the differentiation for generating the frequency demodulated signal s(kT) is performed in step S25 according to equation (28) before the process is repeated with the next sample k=k+1 beginning from step S21.

If, on the other hand, it is determined in step S21 that condition (26) is not satisfied then the variable w(kT) will be set to w(kT)=w(kT)+1 in step S23. Corresponding thereto, w(kT) will be set to w(kT)=w(kT)-1 in step S24 when it is determined in step S22 that condition (27) is satisfied before step S25 is performed.

Figure 8:
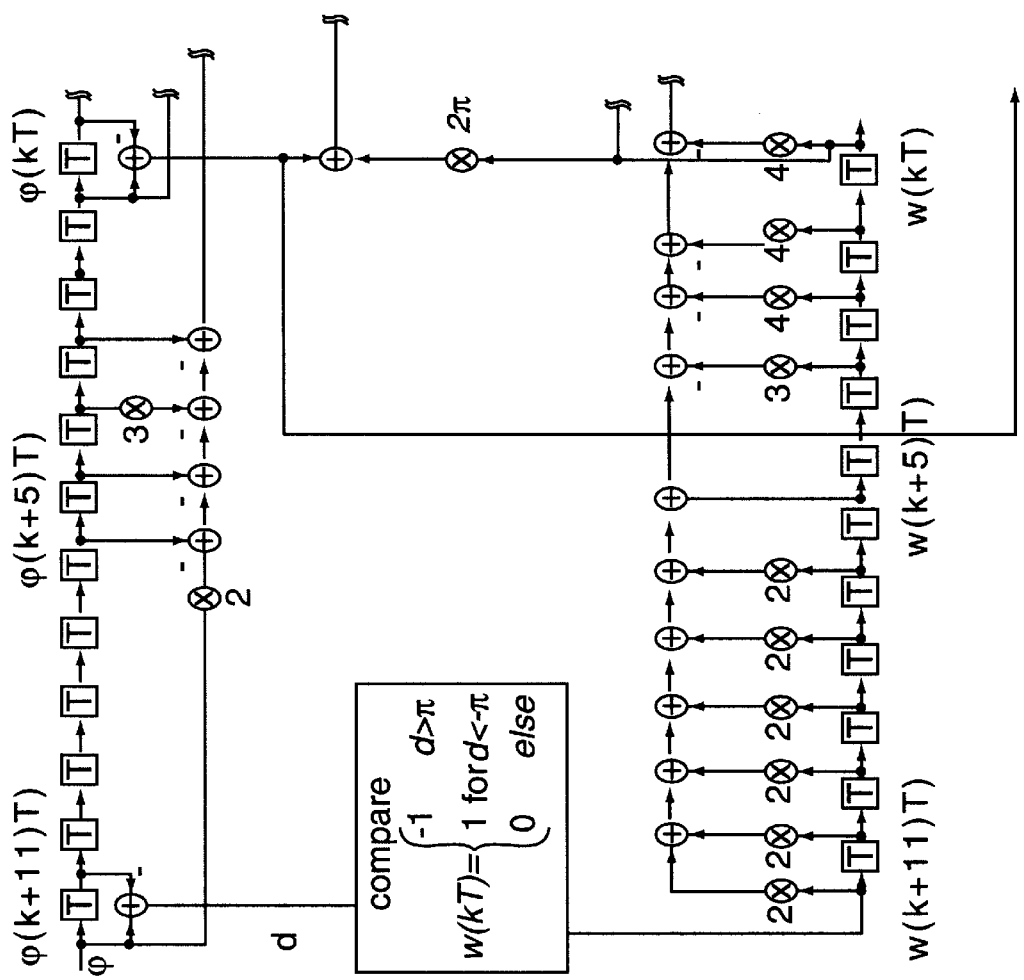
FIG. 8 shows a direct realization of the blocks for unwrapping the phase, detection and elimination of the distortions and differentiation according to the second embodiment of the invention.
Figure 8:
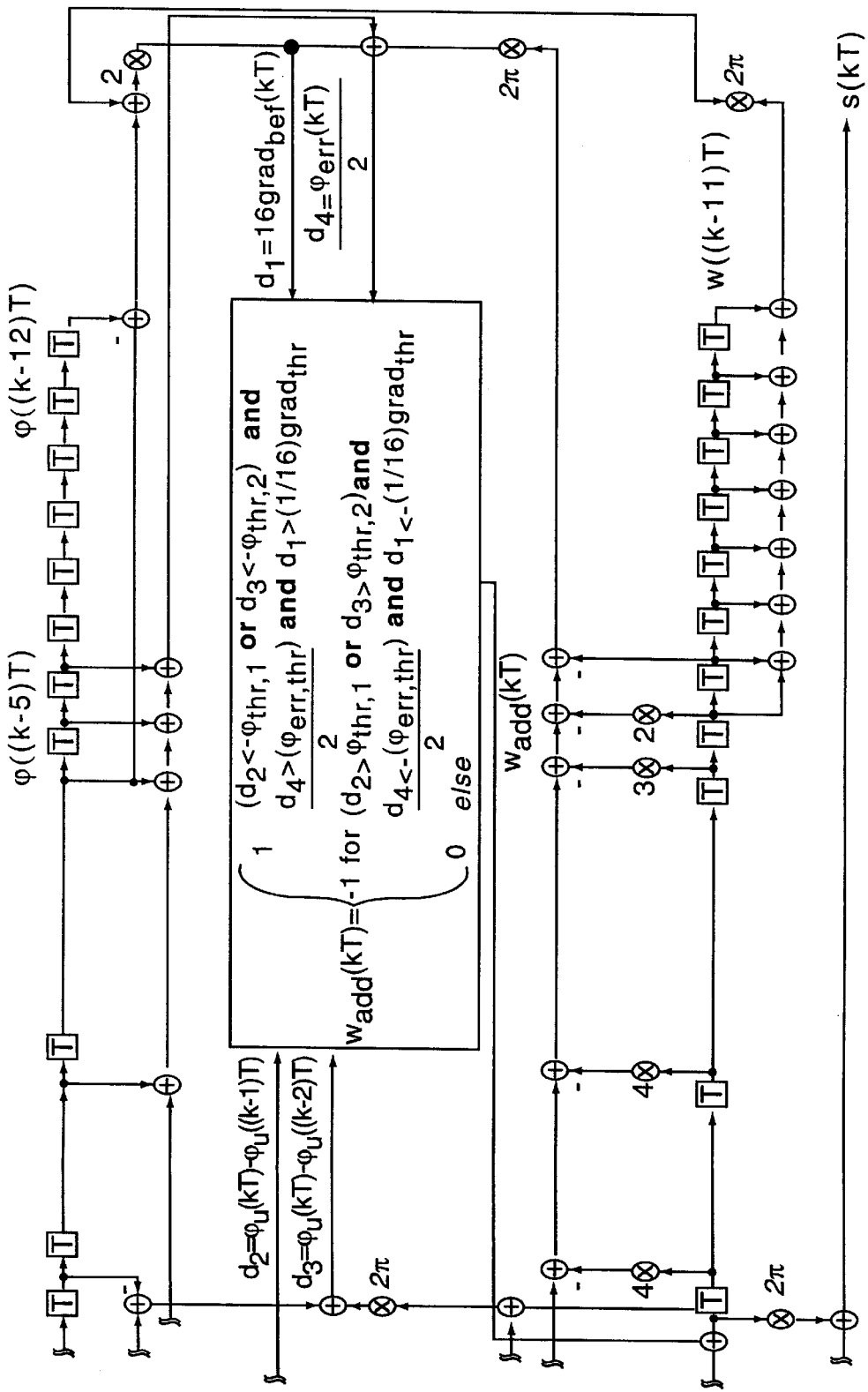

FIG. 8 shows a direct realization of the digital threshold extension unit 5 and the differentiation unit 6 according to the second embodiment of the present invention. This block diagram is realized with delay elements of order T, multipliers, adders, subtractors and two comparing units. The block diagram is directly derivable from the above equations and conditions (19) to (25).

Figure 9:
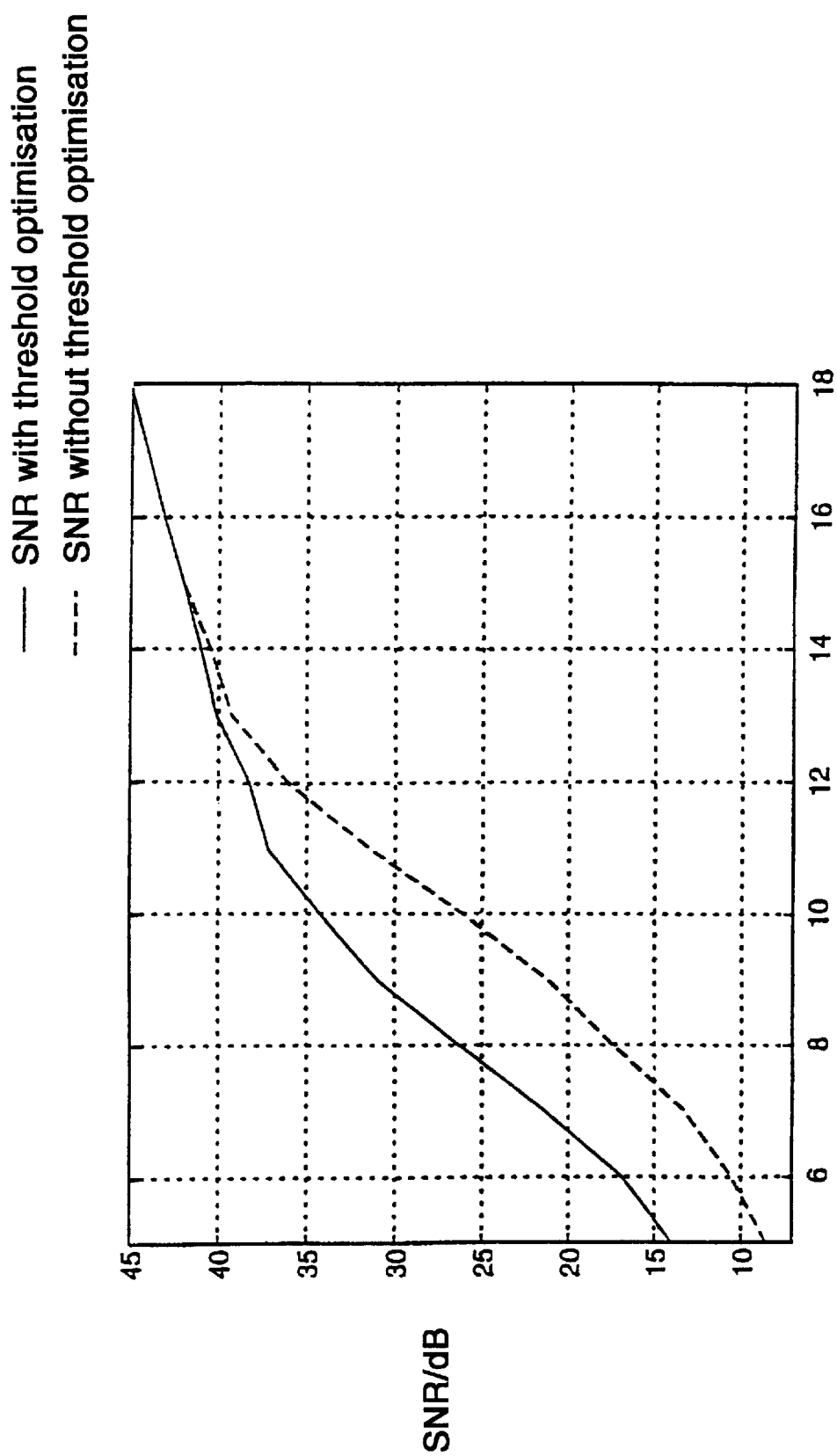
FIG. 9 shows the signal to noise ratio at the demodulator output for a state of the art fm-demodulator and a fm-demodulator according to the present invention.

FIG. 9 shows the signal to noise ratio of a frequency demodulated music signal with (solid line) and without (broken line) threshold extension according to the present invention. The simulation was done with parameters as they are used for fm-audio broadcasting, so that the frequency deviation is Δω=2π·75 kHz and a deemphasis filter is included at the demodulator output. The fm-threshold can be seen at approximately CNR=17 dB. The gain in the signal to noise ratio caused by the treshold extension is approximately 9 dB. The gain in the SNR is dependent on the frequency deviation of the modulated signal. The higher the frequency deviation Δω the higher the gain in SNR.

What is claimed is:

1. Method for digitally demodulating a frequency modulated signal ($a_{fm}(t)$), comprising the following steps:
    a) calculating a phase ($\phi$) of a digital complex baseband signal $c_T(kT)$ of the received frequency modulated signal ($a_{fm}(t)$);
    b) calculating an unwrapped phase ($\phi_u$) of the phase ($\phi$);
    c) detection and elimination of $2\pi$ phase jumps in the unwrapped phase ($\phi_u$) to generate a corrected phase ($\phi_e$); and
    d) differentiation of the corrected phase ($\phi_e$).

2. Method according to claim 1, characterized in that said step b) comprises the following steps for every incoming sample of the phase ($\phi$);

b1) subtracting $2\pi$ from the actual sample of the phase ($\phi(kT)$) and a predetermined number (I) of following samples of the phase ($\phi((k+1)T) \ldots \phi((k+I)T)$) if the difference in-between the actual sample of the phase ($\phi(kT)$) and the preceding sample of the phase ($\phi((k-1)T)$) exceeds $\pi$; and
    b2) adding $2\pi$ to the actual sample of the phase ($\phi(kT)$) and a predetermined number (I) of following samples of the phase ($\phi((k+1)T) \ldots \phi((k+I)T)$) if the difference in-between the actual sample of the phase ($\phi(kT)$) and the preceding sample of the phase ($\phi((k-1)T)$) falls below $-\pi$.

3. Method according to claim 1, characterized in that said step c) comprises the following steps for every sample of the unwrapped phase ($\phi_u$):
    c1) adding $2\pi$ to the actual sample of the unwrapped phase ($\phi_u(kT)$) and a predetermined number (I) of following samples of the unwrapped phase ($\phi_u((k+1)T) \ldots \phi_u((k+I)T)$) if the difference in-between the actual sample of the unwrapped phase ($\phi_u(kT)$) and the preceding sample of the un-wrapped phase ($\phi_u((k-1)T)$) falls below a negative first threshold value ($-\phi_{thr1}$) and the gradient ($grad_{bef}(kT)$) of the unwrapped phase before the actual sample of the unwrapped phase ($\phi_u(kT)$) or the gradient ($grad_{aft}(kT)$) of the unwrapped phase after the actual sample of the unwrapped phase ($\phi_u(kT)$) or a combination of both is higher than a gradient threshold ($grad_{thr}$); and
    c2) subtracting $2\pi$ from the actual sample of the unwrapped phase ($\phi_u(kT)$) and a predetermined number (I) of following samples of the unwrapped phase ($\phi_u((k+1)T) \ldots \phi_u((k+I)T)$) if the difference in-between the actual sample of the unwrapped phase ($\phi_u(kT)$) and the preceding sample of the unwrapped phase ($\phi_u((k-1)T)$) exceeds the positive first threshold value ($\phi_{thr1}$) and the gradient ($grad_{bef}(kT)$) of the unwrapped phase before the actual sample of the unwrapped phase ($\phi_u(kT)$) or the gradient ($grad_{aft}(kT)$) of the unwrapped phase after the actual sample of the unwrapped phase ($\phi_u(kT)$) or a combination of both falls below the negative gradient threshold ($-grad_{thr}$).

4. Method according to claim 1, characterized in that said step c) comprises the following steps for every sample of the unwrapped phase ($\phi_u$):
    cI) adding $2\pi$ to the actual sample of the unwrapped phase ($\phi_u(kT)$) and a predetermined number (I) of following samples of the unwrapped phase ($\phi_u((k+1)T) \ldots \phi_u((k+I)T)$) if the difference in-between the actual sample of the unwrapped phase ($\phi_u(kT)$) and the preceding sample of the unwrapped phase ($\phi_u((k-1)T)$) falls not below a negative first threshold value ($-\phi_{thr1}$) but the difference in-between the actual sample of the unwrapped phase ($\phi_u(kT)$) and the sample before the preceding sample of the unwrapped phase ($\phi_u((k-2)T)$) falls below a negative second threshold value ($-\phi_{thr2}$), and the gradient ($grad_{bef}(kT)$) of the unwrapped phase before the actual sample of the unwrapped phase ($\phi_u(kT)$) or the gradient ($grad_{aft}(kT)$) of the unwrapped phase after the actual sample of the unwrapped phase ($\phi_u(kT)$) or a combination of both is higher than a gradient threshold ($grad_{thr}$); and
    cII) subtracting $2\pi$ from the actual sample of the unwrapped phase ($\phi_u(kT)$) and a predetermined number (I) of following samples of the unwrapped phase ($\phi_u((k+1)T) \ldots \phi_u((k+I)T)$) if the difference in-between the actual sample of the unwrapped phase ($\phi_u(kT)$) and the preceding sample of the unwrapped phase ($\phi_u$((k−1)T)) does not exceed the positive first threshold value ($\phi_{thr1}$) but the difference in-between the actual sample of the unwrapped phase ($\phi_u$(kT)) and the sample before the preceding sample of the unwrapped phase ($\phi_u$((k−2)T)) exceeds the positive second threshold value ($\phi_{thr2}$), and the gradient (grad$_{bef}$(kT)) of the unwrapped phase before the actual sample of the unwrapped phase ($\phi_u$(kT)) or the gradient (grad$_{aft}$(kT)) of the unwrapped phase after the actual sample of the unwrapped phase ($\phi_u$(kT)) or a combination of both falls below the negative gradient threshold (−grad$_{thr}$).

5. Method according to claim 2, characterized in that said predetermined number (I) of following samples are all following samples.

6. Method according to claim 1, characterized in that said step b) comprises the following steps for every incoming sample of the phase ($\phi$):

b1) setting a helper variable (w(kT) to −1 if the difference in-between the actual sample of the phase ($\phi$(kT)) and the preceding sample of the phase ($\phi$((k−1)T)) exceeds $\pi$;

b2) setting the helper variable (w(kT)) to 1 if the difference in-between the actual sample of the phase ($\phi$(kT)) and the preceding sample of the phase ($\phi$((k−1)T)) falls below −$\pi$; and b3) setting the helper variable (w(kT)) to 0 if the difference in-between the actual sample of the phase ($\phi$(kT)) and the preceding sample of the phase ($\phi$((k−1)T)) lies in the interval inbetween −$\pi$ and $\pi$.

7. Method according to claim 6, characterized in that said step c) comprises the following steps for every sample of the unwrapped phase ($\phi_u$):

c1) adding 1 to said helper variable (w(kT)) if the difference in-between the actual sample of the unwrapped phase ($\phi_u$(kT)) and the preceding sample of the unwrapped phase ($\phi_u$((k−1)T)) falls below a negative first threshold value (−$\phi_{thr1}$) and the gradient (grad$_{bef}$(kT)) of the unwrapped phase before the actual sample of the unwrapped phase ($\phi_u$(kT)) or the gradient (grad$_{aft}$(kT)) of the unwrapped phase after the actual sample of the unwrapped phase ($\phi_u$(kT)) or a combination of both is higher than a gradient threshold (grad$_{thr}$); and c2) subtracting 1 from said helper variable (w(kT)) if the difference in-between the actual sample of the unwrapped phase ($\phi_u$(kT)) and the preceding sample of the unwrapped phase ($\phi_u$((k−1)T)) exceeds the positive first threshold value ($\phi_{thr1}$) and the gradient (grad$_{bef}$(kT)) of the unwrapped phase before the actual sample of the unwrapped phase ($\phi_u$(kT)) or the gradient (grad$_{aft}$(kT)) of the unwrapped phase after the actual sample of the unwrapped phase ($\phi_u$(kT)) or a combination of both falls below the negative gradient threshold (−grad$_{thr}$).

8. Method according to claim 6, characterized in that said step c) comprises the following steps for every sample of the unwrapped phase ($\phi_u$):

cI) adding 1 to said helper variable (w(kT)) if the difference in-between the actual sample of the unwrapped phase ($\phi_u$(kT)) and the preceding sample of the unwrapped phase ($\phi_u$((k−1)T)) falls not below a negative first threshold value (−$\phi_{thr1}$) but the difference in-between the actual sample of the unwrapped phase ($\phi_u$(kT)) and the sample before the preceding sample of the unwrapped phase ($\phi_u$((k−2)T)) falls below a negative second threshold value (−$\phi_{thr2}$), and the gradient (grad$_{bef}$(kT)) of the unwrapped phase before the actual sample of the unwrapped phase ($\phi_u$(kT)) or the gradient (grad$_{aft}$(kT)) of the unwrapped phase after the actual sample of the unwrapped phase ($\phi_u$(kT)) or a combination of both is higher than a gradient threshold (grad$_{thr}$); and cII) subtracting 1 from said helper variable (w(kT)) if the difference in-between the actual sample of the unwrapped phase ($\phi_u$(kT)) and the preceding sample of the unwrapped phase ($\phi_u$((k−1)T)) does not exceed the positive fist threshold value ($\phi_{thr1}$) but the difference in-between the actual sample of the unwrapped phase ($\phi_u$(kT)) and the sample before the preceding sample of the unwrapped phase ($\phi_u$((k−2)T)) exceeds the positive second threshold value ($\phi_{thr2}$), and the gradient (grad$_{bef}$(kT)) of the unwrapped phase before the actual sample of the unwrapped phase ($\phi_u$(kT)) or the gradient (grad$_{aft}$(kT)) of the unwrapped phase after the actual sample of the unwrapped phase ($\phi_u$(kT)) or a combination of both falls below the negative gradient threshold (−grad$_{thr}$).

9. Method according to claim 6, characterized in that the unwrapped phase ($\phi_u$(kT)) is calculated in a window beginning at sample (k−N)T in the following way:

$$\varphi_u((k-N)T) = \varphi((k-N)T)$$

$$\varphi_u((k-N+1)T) = \varphi((k-N+1)T) + 2\pi w((k-N+1)T)$$

$$\ldots$$

$$\varphi_u((k-N+v)T) = \varphi((k-N+v)T) + 2\pi \sum_{i=1}^{v} w((k-N+1)T),$$

wherein N denotes the beginning of the window for unwrapping the phase ($\phi$(kT)) and v denotes the distance of the sample (k−N+v)T from the beginning (k−N)T of the window for unwrapping the phase.

10. Method according to claim 3, characterized in that said step c1) is only performed if the phase error ($\phi_{err}$(kT)) of the unwrapped phase at the actual sample of the unwrapped phase ($\phi_u$(kT)) exceeds a positive phase error threshold value ($\phi_{err,thr}$) and said step c2) is only performed if the phase error ($\phi_{err}$(kT)) of the unwrapped phase at the actual sample of the unwrapped phase ($\phi_u$(kT)) falls below the negative phase error threshold value (−$\phi_{err,thr}$).

11. Method according to claim 3, characterized in that said first threshold value ($\phi_{thr1}$), said second threshold value ($\phi_{thr2}$) and said gradient threshold (grad$_{thr}$) are determined by experiments depending on the sample rate (1/T).

12. Method according to claim 11, characterized in that said first threshold value ($\phi_{thres1}$) equals to 1.5, said second threshold value ($\phi_{thres2}$) equal to 2 and said gradiend threshold (grad$_{thr}$) equals to 0 when said sampling rate (1/T) is in the range of 410 kHz.

13. Method according to claim 3, characterized in that said phase error ($\phi_{err}$(kT)) of the unwrapped phase at the actual sample of the unwrapped phase ($\phi_u$(kT)) is calculated based on the following equation:

$$\varphi_{err}(kT) = \sum_{d=d_0}^{d_{max}} \varphi_{errbef_{d,e}}(kT) + \sum_{f=f_0}^{f_{max}} \varphi_{erraft_{f,g}}(kT)$$

$$= \sum_{d=d_0}^{d_{max}} \varphi_u((k-d-1)T) + (d+e+1)grad_{bef}(kT) - \varphi_u((k+e)T) +$$

-continued $$\sum_{f=f_0}^{f_{\max}} \varphi_u((k-f-1)T) + (f+g+1)grad_{aft}(kT) - \varphi_u((k+g)T),$$

wherein $grad_{bef}(kT)$ corresponds to the gradient of the unwrapped phase before the actual sample of the unwrapped phase ($\phi_u(kT)$) and $grad_{aft}(kT)$ corresponds to the gradient of the unwrapped phase after the actual sample of the unwrapped phase ($\phi_u(kT)$), $d_0$ and $f_0$ denote the minimal and $d_{max}$ and $f_{max}$ denote the maximal distance of the interpolated samples from k, and d, e, f and g denote the distance of the samples used for the interpolation from k.

14. Method according to claim 13, characterized in that $d_0=f_0=2$, $d_{max}=f_{max}=5$ and e=d, g=f.

15. Method according to claim 3, characterized in that said gradient ($grad_{bef}(kT)$) of the unwrapped phase before the actual sample of the unwrapped phase ($\phi_u(kT)$) is calculated by averaging p samples of the unwrapped phase ($\phi_u$) without those in the direct neighbourhood of the actual sample of the unwrapped phase ($\phi_u(kT)$) according to the following equation, the minimal distance to the actual sample k is o, and said gradient ($grad_{aft}(kT)$) of the unwrapped phase after the actual sample of the unwrapped phase ($\phi_u(kT)$) is calculated by averaging q samples of the unwrapped phase ($\phi_u$) without those in the direct neighbourhood of the actual sample of the unwrapped phase ($\phi_u(kT)$) according to the following equation, the minimal distance to the actual sample k is r:

$$grad_{bef}(kT) = \frac{\varphi_u((k-o)T) - \varphi_u((k-o-p)T)}{p}$$

$$grad_{aft}(kT) = \frac{\varphi_u((k+q+r-1)T) - \varphi_u((k+r-1)T)}{q}$$

16. Method according to claim 15, characterized in that o=r=4 and p=q=8.

17. Method according to claim 10, characterized in that said phase error threshold value ($\phi_{err,thr}$) is determined by experiments depending on the sampling rate (1/T) and a good start value for these experiments is:

$$\phi_{err,thr} \approx \tfrac{1}{2}\phi_{err_{ideal}} = \tfrac{1}{2}\cdot 2\pi \cdot (d_{max}-d_0+f_{max}-f_0+2).$$

18. Method according to claim 17, characterized in that phase error threshold value ($\phi_{err,thr}$) equals to 26 when said sampling rate (1/T) is in the range of 410 kHz.

19. Method according to claim 1, characterized in that said calculation of the phase of the digital complex baseband signal $c_T(kT)$ is performed using the CORDIC algorithm.

20. Device for digitally demodulating a frequency modulated signal ($a_{fm}(t)$), comprising:
   a) a transformation unit (4) to calculate a phase ($\phi$) of a digital complex baseband signal $c_T(kT)$ of the received frequency modulated signal ($a_{fm}(T)$);
   b) a phase unwrap unit (5a) to calculate an unwrapped phase ($\phi_u$) of the phase ($\phi$) output of the transformation unit (4);
   c) a correction unit (5b) to detect and eliminate $2\pi$ phase jumps in the unwrapped phase ($\phi_u$) and to output a corrected phase ($\phi_e$); and
   d) a differentiation unit (6) to differentiate the corrected phase ($\phi_e$).

21. Method according to claim 7, characterized in that said step c1) is only performed if the phase error ($\phi_{err}(kT)$) of the unwrapped phase at the actual sample of the unwrapped phase ($\phi_u(kT)$) exceeds a positive phase error threshold value ($\phi_{err,thr}$) and said step c2). is only performed if the phase error ($\phi_{err}(kT)$) of the unwrapped phase at the actual sample of the unwrapped phase ($\phi_u(kT)$) falls below the negative phase error threshold value ($-\phi_{err,thr}$).

22. Method according to claim 7, characterized in that said first threshold value ($\phi_{thr1}$), said second threshold value ($\phi_{thr2}$) and said gradiend threshold ($grad_{thr}$) are determined by experiments depending on the sampling rate (1/T).

23. Method according to claim 22, characterized in that said first threshold value ($\phi_{thres1}$) equals to 1.5, said second threshold value ($\phi_{thres2}$) equals to 2 and said gradiend threshold ($grad_{thr}$) equals to 0 when said sampling rate (1/T) is in the range of 410 kHz.

24. Method according to claim 7, characterized in that sad phase error ($\phi_{err}(kT)$) of the unwrapped phase at the actual sample of the unwrapped phase ($\phi_u(kT)$) is calculated based on the following equation:

$$\varphi_{err}(kT) = \sum_{d=d_0}^{d_{\max}} \varphi_{errbef_{d,e}}(kT) + \sum_{f=f_0}^{f_{\max}} \varphi_{erraft_{f,g}}(kT)$$

$$= \sum_{d=d_0}^{d_{\max}} \varphi_u((k-d-1)T) + (d+e+1)grad_{bef}(kT) - \varphi_u((k+e)T) +$$

$$\sum_{f=f_0}^{f_{\max}} \varphi_u((k-f-1)T) + (f+g+1)grad_{aft}(kT) - \varphi_u((k+g)T),$$

wherein $grad_{bef}(kT)$ corresponds to the gradient of the unwrapped phase before the actual sample of the unwrapped phase ($\phi_u(kT)$) and $grad_{aft}(kT)$ corresponds to the gradient of the unwrapped phase after the actual sample of the unwrapped phase ($\phi_u(kT)$), $d_0$ and $f_0$ denote the minimal and $d_{max}$ and $f_{max}$ denote the maximal distance of the interpolated samples from k, and d, e, f and g denote the distance of the samples used for the interpolation from k.

25. Method according to claim 24, characterized in that $d_0=f_0=2$, $d_{max}=f_{max}=5$ and e=d, g=f.

26. Method according to claim 7, characterized in that said gradient ($grad_{bef}(kT)$) of the unwrapped phase before the actual sample of the unwrapped phase ($\phi_u(kT)$) is calculated by averaging p samples of the unwrapped phase ($\phi_u$) without those in the direct neighbourhood of the actual sample of the unwrapped phase ($\phi_u(kT)$) according to the following equation, the minimal distance to the actual sample k is o, and said gradient ($grad_{aft}(kT)$) of the unwrapped phase after the actual sample of the unwrapped phase ($\phi_u(kT)$) is calculated by averaging q samples of the unwrapped phase ($\phi_u$) without those in the direct neighbourhood of the actual sample of the unwrapped phase ($\phi_u(kT)$) according to the following equation, the minimal distance to the actual sample k is r:

$$grad_{bef}(kT) = \frac{\varphi_u((k-o)T) - \varphi_u((k-o-p)T)}{p}$$

$$grad_{aft}(kT) = \frac{\varphi_u((k+q+r-1)T) - \varphi_u((k+r-1)T)}{q}$$

27. Method according to claim 26, characterized in that o=r=4 and p=q=8.

28. Method according to anyone of claim 21, characterized in that said phase error threshold value ($\phi_{err,thr}$) is determined by experiments depending on the sampling rate (1/T) and a good start value for these experiments is:

$$\phi_{err,thr} \approx \frac{1}{2}\phi_{err_{ideal}} = \frac{1}{2} \cdot 2\pi \cdot (d_{max} - d_0 + f_{max} - f_0 + 2).$$

29. Method according to claim 28, characterized in that phase error threshold value ($\phi_{err,thr}$) equals to 26 when said sampling rate (1/T) is in the range of 410 kHz.

30. Method according to claim 21, characterized in that said calculation of the phase of the digital complex baseband signal $c_T(kT)$ is performed using the CORDIC algorithm.

* * * * *